United States Patent
Wilson

[15] 3,651,879
[45] Mar. 28, 1972

[54] CONVERTIBLE VEHICLE

[72] Inventor: Leon Ray Wilson, Box 943, R.R. 1, South Great Falls, Mont. 59401

[22] Filed: May 29, 1969

[21] Appl. No.: 828,948

[52] U.S. Cl. .................................180/5 R, 180/9.2, 305/29
[51] Int. Cl. ...............................B62m 27/02, B62d 55/04
[58] Field of Search................180/5, 5 A, 9.2, 9.38; 305/29, 305/30, 31, 32, 22, 27

[56] References Cited

UNITED STATES PATENTS

| | | | |
|---|---|---|---|
| 2,367,751 | 1/1945 | Bombardier | 305/27 |
| 1,256,744 | 2/1918 | Tolsma | 305/30 |
| 1,425,835 | 8/1922 | Bufe | 180/5 A |
| 1,831,012 | 11/1931 | Kornbeck | 305/27 |
| 1,856,068 | 5/1932 | Christie | 305/31 X |
| 2,467,947 | 4/1949 | Skelton | 305/31 X |

Primary Examiner—Richard J. Johnson
Attorney—John J. Byrne

[57] ABSTRACT

A motor vehicle designed for use in deep sand as a "dune buggy" but easily adaptable for use in snow by the application of traction belts to the driven rear wheels and skis to the front wheels. Tension wheels and pressure rollers insuring maximum traction surface contact with the snow are mounted on the frame of the vehicle by a single mounting rod or pin such that the entire tension wheel and pressure roller assembly can be removed in one step. The pressure rollers are journaled to independently pivotally mounted rods further insuring more complete traction surface contact.

13 Claims, 5 Drawing Figures

3,651,879

PATENTED MAR 28 1972

INVENTOR.
Leon Ray Wilson

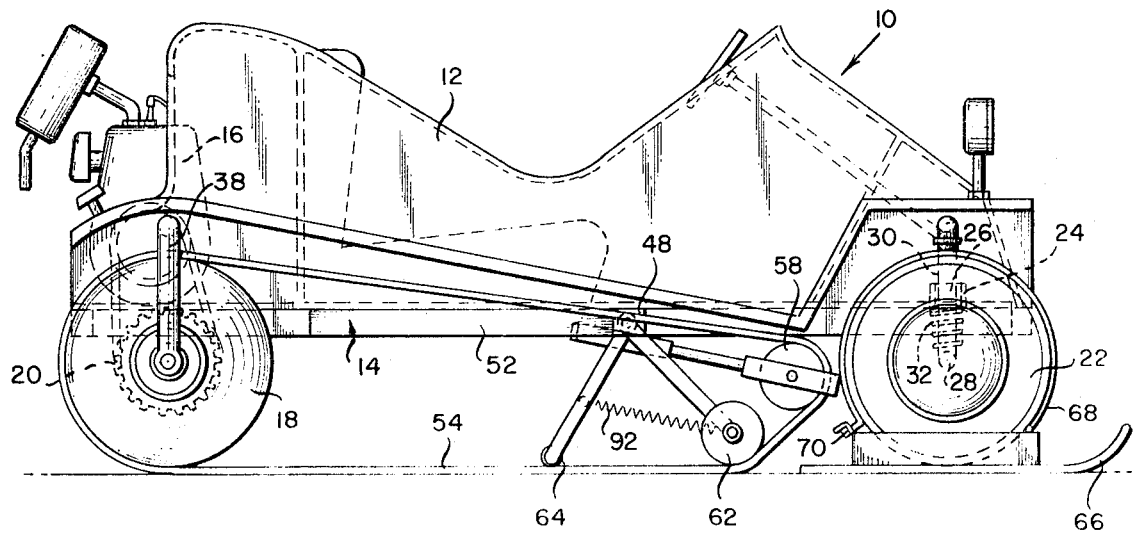
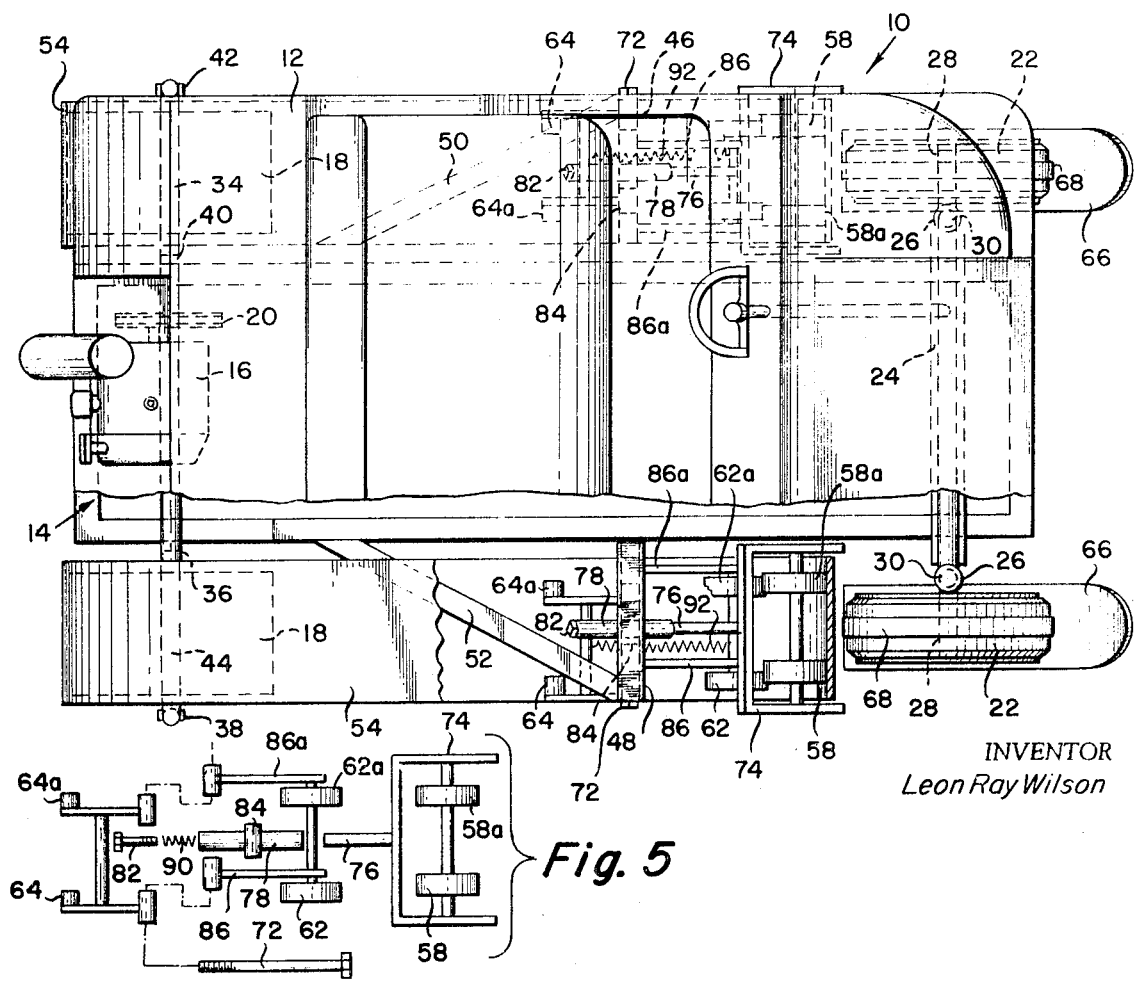

CONVERTIBLE VEHICLE

This invention relates to a convertible motor vehicle and specifically to a motor vehicle which can be driven in deep sand or snow as well as on normal roadway surfaces.

So called "dune buggies" and "snow cats" are becoming quite popular as both a form of leisure-time entertainment and a mode of transportation. Each vehicle in itself is relatively expensive. The ownership of both by a single person, family or company may be financially prohibitive. This invention relates to a "dune buggy" or the like, which may be readily and easily convertible for use in deep snow enabling one vehicle to serve as a "dune buggy" or a "snow cat" as desired. In this invention, traction increasing means in the form of a flexible traction belt and tensioning means are applied to the vehicle for snow use.

The use of the vehicle of this invention is not limited to recreational use but can be used for industrial and military purposes. It is particularly adaptable for year-round farm or ranch work.

It is known to apply traction increasing devices in the form of an endless traction belt to a conventional vehicle enabling the vehicle to be used on sand and/or snow. It is an object of this invention, however, to provide a vehicle for use on sand or snow which may be converted for use on one or the other in a simple manner in a minimum amount of time.

It is a further object of this invention to provide a more effective tension wheel and pressure roller assembly insuring that a maximum of traction surface area is in contact with the snow or sand surface at all times.

It is a further object of this invention to provide skis which may be easily attached to the front steerable wheels of the vehicle by simply driving the front wheels onto the skis and attaching a band around the wheels locking the skis in place.

Specifically, the invention comprises in combination with a vehicle having a body frame and having a steerable front wheel and a driven rear wheel mounted on said frame, means for increasing the traction of the rear wheel. The traction increasing means comprises a tension wheel mounted on the frame and a flexible traction belt extending around and engaging a portion of the driven rear wheel and around the tension wheel. The traction belt is frictionally driven by the rear wheel. The tension wheel is spring biased in a direction away from the rear wheel and substantially parallel to the horizontal to maintain constant tension on the belt. Pressure rollers are mounted on the frame and extend downwardly engaging the lower run of the belt to insure maximum traction contact. The wheel and pressure rollers are mounted by common means on the frame enabling the wheel and rollers to be removed simultaneously from the frame upon the single step of removing the common mounting means.

These and other objects of the invention will become more apparent to those skilled in the art by reference to the following detailed description when viewed in light of the accompanying drawings wherein:

FIG. 3 is a side view in elevation of the motor vehicle of this invention with the traction increasing means and skis in position;

FIG. 4 is a top plan view of the motor vehicle shown in FIG. 3 with portions broken away; and FIG. 5 is a view showing the disassembly of the mounting means for the pressure rollers and tensioning wheel.

Figure 1:
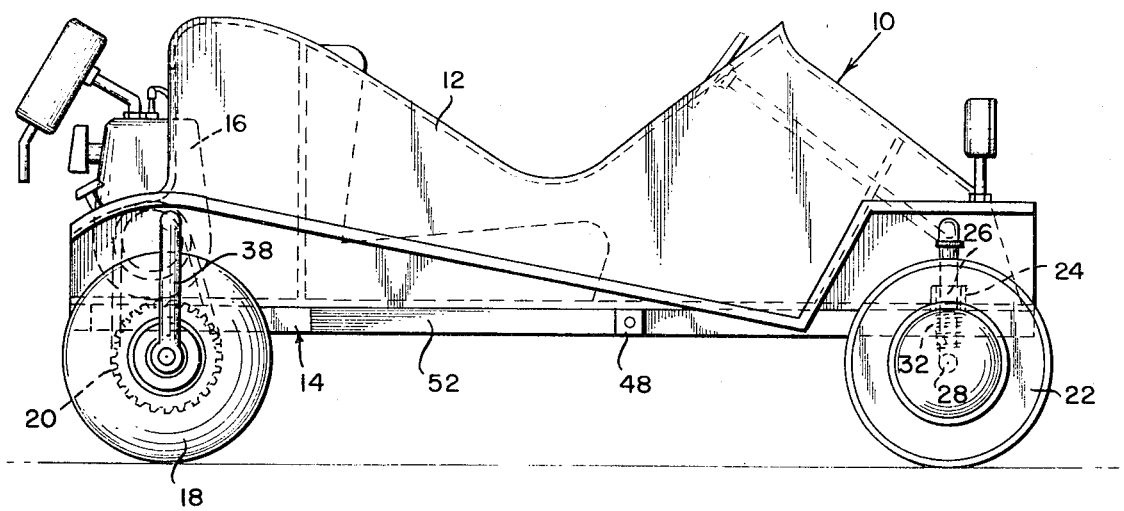
FIG. 1 is a side view in elevation of the motor vehicle of this invention without the traction increasing means.
Figure 2:
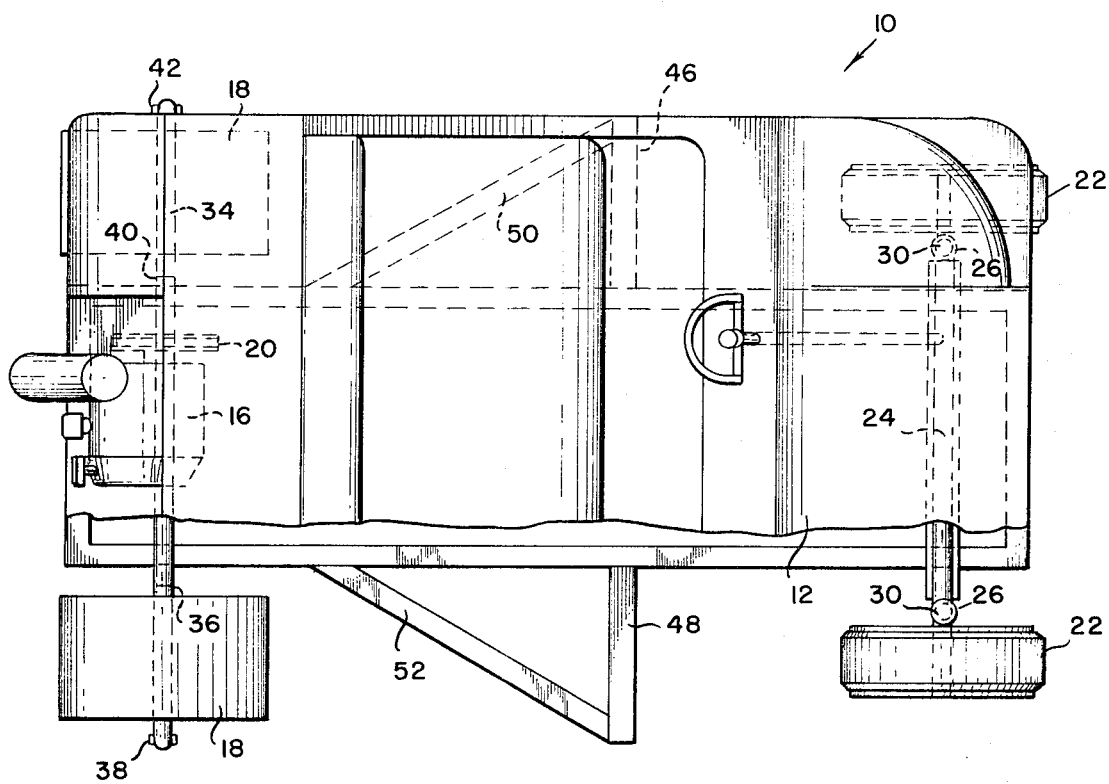
FIG. 2 is a top plan view of the vehicle shown in FIG. 1 with portions broken away.

Referring now to FIG. 3, the motor vehicle of this invention is generally indicated by the numeral 10. The body 12 is of a suitable moldable plastic material mounted on a frame 14. As shown, an internal combustion engine 16 is in the rear of the vehicle and drives the rear wheels 18 by sprocket and chain arrangement 20. It is to be understood, however, that any suitable drive means may be employed. It is further to be understood that conventional steering mechanisms are employed with relation to the front wheels 22. As shown in FIG. 1 and FIG. 2, the vehicle is ready for use in sand or other soft ground surfaces.

The frame includes a front wheel support beam 24 extending across the frame 14 and terminating in front wheel support journals 26. The front wheels are rotatably mounted on stub axles 28 each having a vertically extending portion 30 that extends through its respective support journals 26. Suitable coil springs 32 are provided as the front wheel suspension means.

A rear wheel support beam 34 extends across the rear portion of the frame 14 and terminates on either side of the frame in downwardly depending legs 36, 38, 40 and 42. The legs 36 and 38 are on either side of one wheel and the legs 40 and 42 are on either side of the other rear wheel. Apertures are provided in the depending legs for receiving an axle 44. The axle extends through holes through the hubs of the wheels and is held in place by suitable lug nuts. Laterally extending tensioning wheel and pressure rollers support beams 46 and 48 are provided on either side of the frame 14 and are attached thereto. Reinforcing beams 50 and 52 insure the stability of the support beams 46 and 48. Further the reinforcing beams 50 and 52 serve the purpose of limiting the downward movement of the tensioning wheels as will be pointed out later.

The vehicle may be converted for use in snow as indicated in FIGS. 3 and 4. The vehicle 10 when equipped for use in snow, includes flexible traction belts 54 on each side which extend around each of the driven rear wheels and around tensioning wheels 58 and 58a. Pressure rollers 62 and 62a and 64 and 64a are provided on each side of the vehicle in association with each traction belt. It is to be understood that the belt has a separable link whereby it may be disconnected and passed over the driven rear wheel.

The front wheels are provided with skis 66. Each ski has a band 68 which is attached at one end to the ski and is passed around the wheel and locked at a rear portion of the ski by a suitable lug nut 78 which is in threaded engagement with a bolt portion on the band to tighten the band about the wheel and hold the ski in place.

The pressure rollers 62, 62a, 64, 64a and the tension wheels 58 and 58a are mounted to the support beam 48 by a common mounting means in the form of a rod or pin 72 as best seen in FIG. 5. The tension wheels 58, 58a are journaled in a support bracket 74 which is attached to a shaft 76. The shaft is telescopically received in a tube 78. The tube 78 has a spring 80 mounted therein and receives an adjustable spring tensioning bolt 82 in one end thereof to maintain a constant biasing force against the shaft 76 thereby forcing the tensioning wheels outwardly against the inner surface of the flexible traction belt. Extending transversely of the tube 78 is a connecting tube 84 through which the pin 72 extends to pivotally support the tensioning wheels. The pressure rollers are journaled to rods 86, 86a, 88 and 88a. Each of these rods are also provided with transversely depending connecting tubes, similar to connecting tube 84, through which the pin 72 extends for pivotally supporting the shafts and rollers. The respective connecting tubes are shown mounted in an interdigitating arrangement on the pin 72.

It can easily be seen that by removal of the pin 72 and disconnection of the removable link in the flexible traction belt 66, the entire traction increasing assembly can be removed from the vehicle. This is in contrast to prior art devices wherein the traction increasing devices are either permanent parts of the vehicle or are mounted in a complicated manner precluding easy disassembly.

In operation, all one has to do to convert the "dune buggy" to a "snow cat" is to mount the tension wheels and pressure rollers by means of the single common mounting means or lock pins 72 and extend the flexible belts around the rear wheels and the pressure wheels and tension wheels. The skis are then attached to the front wheels in the manner described and the vehicle is now ready for use in snow.

Another important feature of this invention is that the rods for the pressure rollers are independently pivotally mounted such that the wheels operate similar to a tandem wheel assembly. That is, if the belt passes over a hard object such as rock or the like under the area of roller 62, the roller 62 will pivot upwardly, however, the roller 64 will maintain substantially constant pressure contact with the lower run of the traction belt insuring that traction contact with the ground is maintained at that point. Additionally, a spring 92 spans the rods biasing them into constant engagement with the lower run of the traction belt.

The reinforcing beam 50 acts as an abutment for the upper portion of the tube 78 which supports the tension wheels 58 and 58a to limit downward movement of the tension wheels. It is important that the tension wheel biasing effect be in a direction substantially parallel to the horizontal and away from the rear driven wheel to maintain a constant tension on the traction belt. If the wheel were permitted to move downwardly in an unlimited manner, the tension would not be adequately maintained.

I claim:

1. In combination with a vehicle having a body frame and having a steerable front wheel and a driven rear wheel mounted on said frame, means for increasing the traction of said rear wheel, said means comprising a tension wheel assembly mounted on said frame, a flexible traction belt adapted to extend around said driven rear wheel and around said tension wheel, said tension belt being driven by said rear wheel, said tension wheel being spring biased in a direction away from said rear wheel and substantially parallel to the horizontal to maintain constant tension on said belt, a pressure roller assembly mounted on said frame and extending downwardly and engaging the lower run of said belt to insure maximum traction contact, and common means mounting said tensioning wheel assembly and said pressure assembly on said frame whereby said assemblies may be removed simultaneously from said frame upon removal of said common means, said common mounting means comprising an elongated pin attached to said frame, and including first and second connecting means on said tension wheel assembly and said pressure roller assembly respectively for connecting said assemblies to said pin for independent pivotal movement about said pin.

2. A combination as defined in claim 1 wherein said tensioning wheel is journaled to a spring biased telescopic tube, said tube being pivotally movable on said mounting means about a horizontal axis, and including abutment means on said frame engaging said tube limiting the extent of downward movement of said wheel.

3. A combination as defined in claim 1 and including a ski and means to secure said ski to said front wheel.

4. A combination as defined in claim 3 wherein said means to secure said ski to said front wheel is a strap fixed at one end to said ski and adapted to extend around said front wheel, and locking means for securing the other end of said strap to the ski holding it securely in place.

5. In combination with a vehicle having a body frame and having a steerable front wheel and a driven rear wheel mounted on said frame, means for increasing the traction of said rear wheel, said means comprising a tension wheel assembly mounted on said frame, a flexible traction belt adapted to extend around said driven rear wheel and around said tension wheel, said traction belt being driven by said rear wheel, said tension wheel being spring biased in a direction away from said rear wheel and substantially parallel to the horizontal to maintain constant tension on said belt, said tension wheel assembly comprising a wheel journaled to a spring biased telescopic extensible tube, said tube being pivotally movable on said mounting means about a horizontal axis, and including abutment means on said frame engaging said tube limiting the extent of downward movement of said wheel, a pressure roller assembly mounted on said frame and extending downwardly and engaging the lower run of said belt to insure maximum traction contact, an elongated pin on said frame, first and second connecting means connecting said assemblies to said pin for independent pivotal movement about said pin.

6. A combination as defined in claim 5 wherein there are two pressure rollers, and including two rods, each pivotally supported at one end on said mounting means, and having a pressure roller journaled at the other end, said rods extending downwardly and outwardly from said mounting means in opposite directions, and spring means spanning the distance between said rods and connected thereto whereby said rods are drawn toward each other thereby maintaining the pressure rollers in engagement with the bottom run of the belt.

7. A combination as defined in claim 5 and including a ski and means to secure said ski to said front wheel.

8. A combination as defined in claim 7 wherein said means to secure said ski to said front wheel is a strap fixed at one end to said ski and adapted to extend around said front wheel, and locking means for securing the other end of said strap to the ski holding it securely in place.

9. In combination with a vehicle having a body frame and having a steerable front wheel and a driven rear wheel mounted on said frame, means for increasing the traction of said rear wheel, said means comprising a tension wheel assembly mounted on said frame, a flexible traction belt adapted to extend around said driven rear wheel and around said tension wheel, said traction belt being driven by said rear wheel, said tension wheel being spring biased in a direction away from said rear wheel and substantially parallel to the horizontal to maintain constant tension on said belt, a pressure roller assembly mounted on said frame and extending downwardly and engaging the lower run of said belt to insure maximum traction contact, and common means mounting said tensioning wheel assembly and said pressure roller assembly on said frame whereby said assemblies may be removed simultaneously from said frame upon removal of said common means said pressure roller assembly comprising at least two pressure rollers, and including at least two rods each pivotally supported at one end on said mounting means and having one of said pressure rollers journaled to the other end, said rods extending downwardly and outwardly from said mounting means in opposite directions, and spring means spanning the distance between said rods and connected thereto whereby said rods are drawn toward each other thereby maintaining the pressure rollers in engagement with the bottom run of the belt.

10. A combination as defined in claim 9 wherein said tensioning wheel is journaled to a spring biased telescopic tube, said tube being pivotally movable on said mounting means about a horizontal axis, and including abutment means on said frame engaging said tube limiting the extent of downward movement of said wheel.

11. A combination as defined in claim 9 wherein said rods are independently pivotally mounted.

12. A combination as defined in claim 9 and including a ski and means to secure said ski to said front wheel.

13. A combination as defined in claim 12 wherein said means to secure said ski to said front wheel is a strap fixed at one end to said ski and adapted to extend around said front wheel, and locking means for securing the other end of said strap to the ski holding it securely in place.

* * * * *